United States Patent [19]
Horrion et al.

[11] Patent Number: 6,001,484
[45] Date of Patent: Dec. 14, 1999

[54] COMPOSITE ARTICLE OF CELLULOSE ESTERS AND THERMOPLASTIC ELASTOMERS

[75] Inventors: Jacques Horrion, Tilff, Belgium; John M. Scoarste, Medina, Ohio

[73] Assignee: Advanced Elastomer Systems, L.P., Akron, Ohio

[21] Appl. No.: 09/005,328

[22] Filed: Jan. 9, 1998

[51] Int. Cl.$^6$ ...................................................... B32B 27/00
[52] U.S. Cl. .................. 428/425.1; 156/243; 156/308.2; 428/479.3; 428/481; 428/507; 428/508; 428/509
[58] Field of Search ................................ 156/243, 308.2; 428/423.3, 423.5, 423.7, 424.2, 424.8, 425.1, 479.3, 481, 507, 508, 509

[56] References Cited

U.S. PATENT DOCUMENTS

| | | | |
|---|---|---|---|
| 4,548,843 | 10/1985 | Kozuka et al. | 428/31 |
| 5,242,977 | 9/1993 | Franke et al. | 525/90 |

FOREIGN PATENT DOCUMENTS

| | | |
|---|---|---|
| 0 517 471 A2 | 12/1992 | European Pat. Off. . |
| 57-174366 | 10/1982 | Japan . |
| WO 95/26380 | 10/1995 | WIPO . |

OTHER PUBLICATIONS

"Styrene–Ethylene–Butylene–Styrene and SBS Block Copolymer Elastomers," *Research Disclosure*, V. 398, No. 045, Jun. 10, 1997.

Van Meesche et al, "Adhesion of Elastomeric Alloy Thermoplastic Vulcanizates," *Elastomerics*, Sep. 1987, pp. 21–25.

Vanderkooi et al, "Bonding Olefinic Thermoplastic Elastomers," *Rubber World*, May 1985.

*Primary Examiner*—D. S. Nakarani
*Attorney, Agent, or Firm*—William A. Skinner

[57] ABSTRACT

The invention relates to a method to adhere a hard cellulose ester compound to a surface of a soft thermoplastic elastomer compound and shaped composite articles comprising said components.

13 Claims, No Drawings

COMPOSITE ARTICLE OF CELLULOSE ESTERS AND THERMOPLASTIC ELASTOMERS

BACKGROUND OF THE INVENTION

1. Field of the Invention

The present invention relates to composite articles of a hard and a soft component having improved adhesion to each other and a method for improving the adhesion. In detail, the hard component is selected from cellulose esters and the soft component is selected from thermoplastic elastomers.

2. Background/Prior art

Cellulose esters are polymers made from renewable energy sources which become more and more popular because of their natural origin. Cellulose esters are transparent which makes them a candidate of choice for applications where transparency and clarity is needed. Furthermore, cellulose esters can be plasticized which increases their toughness at low temperatures. One representative cellulose ester is cellulose propionate.

There are many applications, for instance, in the automobile industry or for mechanical rubber goods, in which a combination of flexible and rigid materials is required. In most cases, a soft component is adhered onto the rigid cellulose propionate. Actually, this can be achieved by putting an adhesive system between the surface and the hard component of the article. These methods, however, are inherently expensive since they require extensive laboratory time. For details it is referred to A. Van Meesche and C. Radar, Adhesion of Elastomeric Alloy Thermoplastic Vulcanizates, in 'Elastomerics', September 1987, pages 21 to 24 and J. P. Vander Kooi and L. A. Goettler, Bonding Olefinic Thermoplastic Elastomers, in 'Rubber World', May 1985. EP-A-0 718 347 discloses a method to adhere thermoplastic elastomer blends to polyester substrates by treating the surface of the substrate with a blocked diisocyanate and optionally an epoxy resin.

One way to reduce the cost of the manufacture of the article is, for instance, to use sequential injection molding, a process during which the soft part is over-molded onto the rigid or hard material, and vice-versa. This technology gives outstanding adhesion between the soft and the hard polymers if they are miscible or at least compatible. If the two polymers are incompatible, they do not adhere together.

Cellulose esters and, as an example, cellulose propionate, are known to be incompatible with any other polymer (see Paul, Polymer Blends, Vol. 1 and 2, Academic Press, New York, 1977).

Therefore it was an object of the present invention to provide a method for adhering polymers, and in detail non-polar thermoplastic elastomers to cellulose esters providing an outstanding adhesion when over-molded, co-molded, co-blow molded or co-extruded.

DESCRIPTION OF THE INVENTION

According to the present invention there is provided a method for adhering a soft polymeric material to the surface of a hard polymeric material which polymeric materials would normally be incompatible with each other. According to the present invention compatibility, i.e., adhesion is achieved by a modifying component which can be added to either or both of the two normally incompatible polymers to be adhered.

In detail the present invention relates to a method to adhere a cellulose ester component to a surface of a thermoplastic elastomer component in the absence of any additional adhesive wherein at least one of said components comprises in a blend a block-copolymer obtainable from (a) about 5 to about 95% by weight, based on the amount of (a)+(b), of a chemically modified polyolefin, (b) about 95 to about 5% by weight, based on the amount of (a)+(b), of a thermoplastic polyurethane (TPU), copolyester or copolyamide, and (c) about 0.05 to about 5.0 parts by weight, based on 100 parts by weight of (a)+(b), of one or more coupling agent(s).

Of course, either of the two polymeric materials mentioned above, i.e., the cellulose ester or the thermoplastic elastomer compound may form the substrate onto which the respective other component is adhered. Furthermore, the modifying block-copolymer can be added to the cellulose ester and/or the thermoplastic elastomer component. Adding the modifying block-copolymer to the cellulose ester may reduce the transparency thereof. Of course, this aspect is of no relevance in case of applications where transparency is not needed.

According to the present invention no adhesive is used at the surface between the two above-mentioned components which are adhered to each other.

The preparation of the thermoplastic elastomer/modifying block-copolymer-blend or the cellulose ester/modifying block-copolymer blend can be carried out by conventional methods which are known in the art.

The amount of the modifying block-copolymer in the respective blend is between about 5 to about 70% by weight, preferably about 10 to about 50% by weight, more preferably about 10 to about 30% by weight, based on the total amount of the respective blend comprising the modifying block-copolymer. If the block-co-polymer is added to both components, the thermoplastic elastomer and the cellulose ester, the amounts for the block-copolymer mentioned above relate to each of the components.

In a further embodiment the present invention relates to a shaped composite article comprising, in adhesion to each other, the cellulose ester component and the thermoplastic elastomer component, wherein at least one of said components comprises in a blend the modifying block-copolymer of the kind and in the amount as defined above. According to the present invention excellent adhesion is achieved without using any adhesive on the surfaces of the components to be adhered.

Further embodiments of the present invention will become apparent from the present description and the claims.

1. Cellulose Ester Component

The cellulose ester component which is used as the transparent and hard component of the present invention is selected from fully or partially acylated cellulose in which the acyl-groups may contain up to 8, preferably up to 6 carbon atoms. Specific examples of cellulose esters are cellulose acetate, cellulose propionate, cellulose acetate propionate, cellulose acetate phthalate and cellulose acetate butyrate, with cellulose propionate being preferred. The invention is not restricted to commercially available materials but further synthetic esters can be used. Of course, blends of the cellulose esters can be used as well. The cellulose esters, their manufacture and their properties are well known in the art.

2. Thermoplastic Elastomer Component

The term "thermoplastic elastomer" (TPE) in general defines blends of polyolefins and rubbers in which blends the rubber phase is not cured, i.e., so called thermoplastic olefins (TPO), blends of polyolefins and rubbers in which blends the rubber phase has been partially or fully cured by a vulcanization process to form thermoplastic vulcanizates (TPV), or unvulcanized styrene/conjugated diene/styrene block-copolymers or blends thereof.

The thermoplastic elastomers according to the present invention are selected from blends of rubbers and polyolefins in which the rubber has been partially or fully ured or in which the rubber is not cured, styrene/conjugated diene/styrene block-copolymers or their hydrogenated derivatives and blends thereof. Preferably, the thermoplastic elastomers are non-polar.

2.1 Rubber/Polyolefin Blend

Polyolefin

The polyolefins include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, and the like, mixtures thereof and copolymers thereof with (meth)acrylates and/or vinyl acetates, and the like. Preferred, however, are monomers having 3 to 6 carbon atoms, with propylene being most preferred. As used in the specification and claims the term polypropylene includes homopolymers of propylene as well as reactor and/or random copolymers of polypropylene which can contain about 1 to about 20 wt % of ethylene and/or an a-olefin comonomer of 4 to 16 carbon atoms, and mixtures thereof. The polypropylene can be highly crystalline isotactic or syndiotactic polypropylene. Commercially available polyolefins may be used in the practice of this invention. Further polyolefins which can be used in terms of the invention are high, low, linear-low, very low-density polyethylenes and copolymers of ethylene with (meth) acrylates and/or vinyl acetates, and the like.

The polyolefins mentioned above can be made by conventional Ziegler/Natta catalyst-systems or by metallocene-based catalyst-systems.

Rubber Component

The curable rubber suitable for use in the manufacture of the thermoplastic elastomer may be monoolefinic copolymer rubbers (elastomers) comprise non-polar, rubbery copolymers of two or more a-monoolefins, preferably copolymerized with at least one polymer, usually a diene. Saturated monoolefin copolymer rubber, for example ethylene-propylene copolymer rubber (EPM) can be used.

However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 5-vinyl norbornene (VNB); 1,6-octadiene; 5-methyl-1,4-hexadiene; 3,7-dimethyl-1,6-octadiene; 1,3-cyclopentadiene; 1,4-cyclohexadiene and dicyclopentadiene (DCPD), and the like.

Butyl rubbers are also useful in the compositions of the invention. As used in the specification and claims, the term "butyl rubber" includes copolymers of an isoolefin and a conjugated monoolefin, terpolymers of an isoolefin and a conjugated monoolefin, terpolymers of an isoolefin with or without a conjugated monoolefin, divinyl aromatic monomers and the halogenated derivatives (halogenated butyl rubber) of such copolymers and terpolymers.

The useful butyl rubber copolymers comprise a major portion of isoolefin and a minor amount, usually less than about 30 wt %, of a conjugated multiolefin. The preferred copolymers comprise about 85–99.5 wt % of a $C_{4-7}$ isoolefin such as isobutylene and 15–0.5 wt % of a multiolefin of 4 to 14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 5,916,180 which is incorporated herein by reference.

Another suitable copolymer within the scope of the olefinic rubber of the present invention is a copolymer of a $C_{4-7}$ isomonoolefin and a para-$C_{1-6}$-alkylstyrene, and preferably a halogenated derivative thereof. The amount of halogen in the copolymer, predominantly in the para-alkylstyrene, is from about 0.1 to about 10 wt %. A preferred example is the brominated copolymer of isobutylene and para-methylstyrene. These copolymers are more fully described in U.S. Pat. No. 5,162,445 which is incorporated herein by reference.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore, polybutadiene rubber and styrene-butadiene-copolymer rubbers can also be used.

Blends of any of the above olefinic rubbers can be employed, rather than a single olefinic rubber.

Further suitable rubbers are nitrile rubbers. Examples of the nitrile group-containing rubber include a copolymer rubber comprising an ethylenically unsaturated nitrile compound and a conjugated diene. Further, the copolymer rubber may be one in which the conjugated diene units of the copolymer rubber are hydrogenated.

Specific examples of the ethylenically unsaturated nitrile compound includes acrylonitrile, α-chloroacrylonitrile, α-fluoroacrylonitrile, methacrylonitrile, and the like. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferred. Especially preferred nitrile rubbers comprise copolymers of 1,3-butadiene and about 10 to about 50 percent of acrylonitrile.

Another suitable rubber in terms of the present invention are based on polychloroprene rubber. These rubbers are commercially available under the trade names Neoprene® and Bayprene®.

The elastomer (rubber) component of the rubber/polyolefin blend may be used uncured to form TPO's or it can be partially or fully vulcanized (crosslinked) to form TPV's. Those ordinary skilled in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the optimum crosslinking desired. Any known cure system can be used, so long as it is suitable under the vulcanization conditions for the elastomer or combination of elastomers being used and is compatible with the thermoplastic polyolefin component of the TPV. These curatives include sulfur, sulfur donors, metal oxides, phenolic resin systems, maleimides, peroxide-based systems, high energy radiation and the like, both with and without accelerators and co-agents.

Another curing system which can be used is the hydrosilylation system which consists of the use of a silicon hydride curative catalyzed with a platinum or rhodium derivative.

Such systems are disclosed, for instance, in EP-A-0776937. Phenolic resin curatives are preferred for the preparation of the TPV composition of the invention, and such cure systems are well known in the art and literature of vulcanization of elastomers. Their use in TPV compositions is more fully described in U.S. Pat. No. 4,311,628, the disclosure of which is fully incorporated herein by this reference. Usually about 5 to about 20 weight parts of the curative or curative system are used per 100 weight parts of the rubber to be cured.

The process of dynamically curing the rubber in a polyolefin matrix is well known in the art. Early work found in U.S. Pat. No. 3,037,954 discloses the technique of dynamic vulcanization wherein a vulcanizable elastomer is dispersed into a resinous thermoplastic polymer and the elastomer is cured in the presence of a curative while continuously mixing and shearing the polymer blend. The resulting composition [dynamically vulcanized alloy, or thermoplastic vulcanizate (TPV)] is a microgel dispersion of cured elastomer in an uncured matrix of thermoplastic polymer. Since then the technology has advanced significantly. For further general background information it is referred to EP-A-0 473 703, EP-A-0 657 504, WO-A-95/26380 and other patent applications of the applicant.

2.2 Styrene/Conjugated Diene/Styrene Block-Copolymers

In the block-copolymers of styrene/conjugated diene/styrene, which are traditionally made by anionic polymerization and in which the conjugated diene may be hydrogenated, non-hydrogenated or partially hydrogenated, the conjugated diene is selected from butadiene, isoprene or a mixture of both. Specific block-copolymers of the styrene/conjugated diene/styrene-type are SBS, SIS, SIBS, SEBS and SEPS block-copolymers, and the like.

Exemplary styrene/conjugated diene/styrene block-copolymers are styrene-butadiene-isoprene-styrene block-copolymer or its hydrogenated derivative, styrene-ethylene-butene-styrene block-copolymer and blends thereof.

3. Modifying Block-Copolymer

The block-copolymer which can be used to modify the components is obtainable from a blend of a (a) chemically modified polyolefin, (b) a thermoplastic polyurethane (TPU), copolyester or copolyamide, and (c) one or more coupling agent(s) for block-copolymerization.

3.1 Modified Polyolefin

The term "modified polyolefin" means a random, block, or graft olefin copolymer having in a main or side chain thereof a functional group such as carboxylic acid; $C_1$ to $C_8$ carboxylate ester such as carbomethoxy, carboethoxy, carbopropoxy, carbobutoxy, carbopentoxy, carbohexoxy, carboheptoxy, carboctoxy, and isomeric forms thereof; carboxylic acid anhydride; carboxylate salts formed from the neutralization of carboxylic acid group(s) with metal ions from Groups I, II, III, IV-A and VII of the periodic table, illustratively including sodium, potassium, lithium, magnesium, calcium, iron, nickel, zinc, and aluminum, and mixtures thereof; amide; epoxy; hydroxy; amino; $C_2$ to $C_6$ acyloxy such as acetoxy, propionyloxy, butyryloxy; and the like; wherein said functional group is part of an unsaturated monomer precursor which is either copolymerized with an olefin monomer or grafted onto a polyolefin to form said modified polyolefin.

The modified polyolefin component defined above is represented by a large number of polyolefin random, block, and graft copolymers which have long been known in the art and, for the most part, are commercially available. Otherwise they are readily prepared using the conventional techniques for polymerizing olefin monomers; see Preparative Methods of Polymer Chemistry, W. R. Sorenson and T. W. Campbell, 1961, Interscience Publishers, New York, N.Y. Illustrative but non-limiting of the basic olefin monomers for copolymerization with the functional group containing unsaturated monomers are ethylene, propylene, butylene, mixtures of ethylene/propylene, mixtures of ethylene/butylene, mixtures of propylene/butylene, mixtures of ethylene/$C_3$ to $C_{12}$ $\alpha,\beta$-unsaturated alkenes, and the like. Alternatively, the above illustrative monomers or mixtures are first polymerized to their corresponding polyolefins prior to grafting with said functional group containing monomers. A preferred class of modified polyolefin comprises a modified polyethylene, that is to say a polyethylene copolymer wherein the major molar proportion (at least 50 percent) of the copolymer consists of ethylene units copolymerized with at least one unsaturated monomer having a functional group substituent defined above, or a polyethylene (HDPE, LDPE or LLDPE) having grafted thereon a minor molar proportion (about 0.005 to 5 percent) of said at least one unsaturated monomer having the functional group substituent.

As illustrative embodiments of modified polyolefins in copolymer form are those derived from the copolymerization of any one of the olefin monomers set forth above but preferably ethylene in the minimum molar proportions of at least 50 percent with a vinyl functional group containing monomer such as acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, zinc acrylate, the ionic hydrocarbon polymers from the polymerization of $\alpha$-oefins with $\alpha,\beta$-ethylenically unsaturated carboxylic acids as described in U.S. Pat. No. 3,264,272 the disclosure of which is incorporated herein by reference, and the like. It will be understood that in the case of the olefin/vinyl acid copolymers that the carboxylic acid groups can be wholly or partially converted to metal salts (i.e., sodium, potassium, zinc) after formation of the copolymer. Such ionic copolymers are collectively recognized by the term "ionomers". The vinyl functional monomers can be used in combination. Furthermore, mixtures of any of these modified polyolefins can be used.

As illustrative embodiments of modified polyolefins in grafted form are those derived from the graft polymerization of any one of the vinyl functional group containing monomers set forth above (preferably maleic anhydride) onto any one of the olefin polymers set forth above but preferably polyethylene (HDPE, LDPE, LLDPE). The proportions of said graft monomers are preferably within the molar range of 0.005 to 5 percent set forth above. As with the copolymers above, mixtures or combinations can be employed. Further, the vinyl functional group containing monomers can be grafted onto the modified polyolefin copolymers discussed above. A preferred embodiment of such a polymer type includes the product obtained by grafting maleic acid or anhydride onto an ethylene/vinyl carboxylate copolymer or the saponified copolymer derived from ethylene/vinyl acetate. The graft copolymerization of the unsaturated carboxylic acid or its functional derivative or another functional group-containing vinyl monomer onto the olefin polymer can be conducted using various methods. For example, the olefin polymer, the graft monomer and a free-radical initiator are incorporated in a solution or suspension of the olefin polymer in a suitable solvent. It is also possible to conduct the graft copolymerization in the presence of the thermoplastic polyurethane elastomer, i.e., after being blended with the thermoplastic polyurethane elastomer.

It will be understood by those skilled in the art that the modified polyolefins can be prepared using any combination of monomer reactants in either a copolymer, grafted copolymer, or copolymer-rafted copolymer configuration. However, a most preferred class of modified polyolefin comprises a copolymer or graft copolymer of ethylene or polyethylene (particularly LDPE or LLDPE) with at least one vinyl monomer having a functional group selected from carboxylic acid, carboxylate salts, dicarboxylic acid or anhydride thereof, carboxylate ester, and acyloxy, and mixtures of said modified polyolefins. Particularly, preferred species of modified polyethylene in this class are ethylene/vinyl acetate copolymer, ethylene/ethylacrylate copolymer, ethylene/methacrylic acid copolymer, ethylene/acrylic acid copolymer, ethylene/maleic anhydride graft copolymer, maleic anhydride grafted ethylene/vinyl acetate copolymer, and mixtures thereof in any combination and proportions.

Another group of modified polyolefins which can be used in terms of the present invention either alone or in combination with the modified polyolefins mentioned above are styrene/ butadiene/styrene-block copolymer (SBS) and its hydrogenated form, i.e., SEBS block-copolymer grafted with the functional grafting group mentioned above.

Specific examples of said grafted modified polyolefin are polypropylene or ethylene propylene rubber grafted with anhydride, acid or primary or secondary amine, ethylene acrylic acid copolymers.

The modified polyolefin is present in the block copolymer according to the invention preferably in amounts from about 20 to about 80 percent by weight, most preferably from about 30 to about 70 percent by weight, based on the total amount of the modified polyolefin (a) and the thermoplastic polyurethane, copolyester or copolyamide.

Best block copolymers are formed when the reactive group of the polyolefin, the coupling agent and the reactive group of the thermoplastic polyurethanes are the same, i.e., when the stoichiometric ratio is used.

3.2 Thermoplastic Polyurethane/Copolyester/Copolyamide 3.2.1 Thermoplastic Polyurethane The polyurethane component has no limitation in respect of its formulation other than the requirement that it be thermoplastic in nature which means that it is prepared from substantially difunctional ingredients, i.e., organic diisocyanates and components being substantially difunctional in active hydrogen containing groups. However, often times minor proportions of ingredients with functionalities higher than 2 may be employed. This is particularly true when using extenders such as glycerol, trimethylol propane, and the like. Such thermoplastic polyurethane compositions are generally referred to TPU materials. Accordingly, any of the TPU materials known in the art can be employed within the scope of the present invention. For representative teaching on the preparation of TPU materials see Polyurethanes: Chemistry and Technology, Part II, Saunders and Frisch, 1964, pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. patent publications U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; 4,631,329; 4,883,837; 3,394,164; 3,644,457; 3,883,571; 4,031,026; 4,115,429; 4,118,411; 4,299,347; 3,384,653; 4,057,595 and 4,631,329 all of which are incorporated herein by reference.

The preferred TPU is a polymer prepared from a mixture comprising at least one organic diisocyanate, at least one polymeric diol and at least one difunctional extender. The TPU may be prepared by the prepolymer, quasi-prepolymer, or one-shot methods in accordance with the methods described in the references cited above.

Any of the organic diisocyanates previously employed in TPU preparation can be employed including blocked or unblocked aromatic, aliphatic, and cycloaliphatic diisocyanates, and mixtures thereof.

The TPU's can be prepared by conventional methods which are known to the artisan, for instance from U.S. Pat. No. 4,883,837 and the further references cited therein.

3.2.2 Thermoplastic Copolyesters

Instead of the thermoplastic polyurethane thermoplastic copolyester elastomers can be employed.

The thermoplastic polyester elastomer (A) is a polyester block copolymer and has, in the polymer chain, (A-1) a high-melting crystalline segment composed mainly of an aromatic polyester unit and (A-2) a low-melting polymer segment composed mainly of an aliphatic polyether unit and/or an aliphatic polyester unit.

The aromatic polyester unit in the high-melting crystalline segment (A-1) (which is a hard segment) is derived from an acid component and a glycol component. The acid component is substantially terephthalic acid and/or 2,6-naphthalene dicarboxylic acid. As the acid component, there may be used, in combination with terephthalic acid and/or 2,6-naphthalene-dicarboxylic acid, a small amount of other aromatic dicarboxylic acid (e.g., isophthalic acid) or an aliphatic dicarboxylic acid (e.g., adipic acid, sebacic acid, cyclohexane-1,4-dicarboxylic acid, dimer acid).

The glycol component constituting the aromatic polyester unit is a glycol of 2–12 carbon atoms, such as ethylene glycol, propylene glycol, tetramethylene glycol, neopentyl glycol, hexanediol, decanediol or mixtures thereof ,or the like.

The aliphatic polyether unit in the low-melting polymer segment (A-2) (which is a soft segment) is derived from a polyalkylene glycol. The polyalkylene glycol is, for example, polyethylene glycol, polypropylene glycol, polytetramethylene glycol or polyethylene glycol-polypropylene glycol block copolymer.

The aliphatic polyester unit, which is another unit in the low-melting polymer segment (A-2), is derived from an aliphatic dicarboxylic acid as a main acid component and a glycol. The aliphatic dicarboxylic acid as a main acid component is, for example, succinic acid, adipic acid, sebacic acid or decane dicarboxylic acid. The aliphatic dicarboxylic acid may be used in combination with a small amount of an aromatic dicarboxylic acid (e.g., isophthalic acid).

The glycol component constituting the aliphatic polyester unit is a glycol of 2–12 carbon atoms. Its specific examples are the same as those mentioned for the glycol component constituting the aromatic polyester unit of the high-melting crystalline segment (A-1).

The aliphatic polyester unit is obtained by polycondensing the above aliphatic dicarboxylic acid and the above glycol by ordinary processes which are known in the art. It may be a homopolyester, a copolyester, or a polylactone (e.g., a poly-$\epsilon$-caprolactone) obtained by subjecting a cyclic lactone to ring-opening polymerization. The upper limit of the melting point of the aliphatic polyester unit is not critical, though it is preferably 130° C. or less, particularly preferably 100° C. or less.

As the thermoplastic polyester elastomer (A), an elastomer having a softening point of 100° C. or more is particularly appropriate.

The thermoplastic polyester elastomer (A) can be produced by ordinary polymerization processes which are known in the art.

3.2.3 Copolyamides

Another alternative for the thermoplastic elastomers are thermoplastic copolyamides, and in detail polyether block amides obtained by the molten state polycondensation reaction of polyetherdiol blocks and dicarboxylic polyamide blocks. Thermoplastic copolyamides and the method of their manufacture are known in the art and it is referred to a comprehensive review in Chapter 9B in "Thermoplastic Elastomers", edited N. R. Legge, G. Holden, H. E. Schroeder, Hanser publishers, 1987 and the references cited therein.

The polyetherdiol blocks are derived from dihydroxypolyoxyethylene, dihydroxypolyoxypropylene and dihydroxypolyoxytetramethylene. The polyamide precursors can be selected from $C_4$ to $C_{18}$, preferably from $C_6$ to $C_{18}$ amino acids or lactams, $C_4$ to $C_{18}$, preferably $C_6$ to $C_{18}$ dicarboxylic acids and diamines. The melting point of the thermoplastic copolyamides which can be used according to the present invention ranges from 120 to 210° C., preferably from 140 to 210° C. The respective copolyamides are commercially available under the designation PEBAX®.

Preferably the amount of the thermoplastic polyurethane, copolyester or copolyamide in the block copolymer is from about 80 to about 20 percent by weight, most preferably from about 70 to about 30 percent by weight, based on the amount of the chemically modified polyolefin (a)+ thermoplastic polyurethane, copolyester or copolyamide.

3.3 The Coupling Agent

The coupling agent (c) is represented by blocked or unblocked aromatic, aliphatic and cycloaliphatic diisocyanates and mixtures thereof. Illustrative isocyanates which can be used as coupling agent are those mentioned above in context with the preparation of the thermoplastic polyurethane. Also included in this definition are polyurethane prepolymers containing isocyanate groups at both ends of the polymer chain.

A combination of the isocyanate coupling agents with another coupling agent may be required in case that the functional group on the modified polyolefin does not react with the isocyanate group of the isocyanate coupling agent. Such co-coupling agents are selected from the group of primary or secondary diamines, diols, diepoxides, amino/hydroxy and amino/epoxy compounds. Said co-coupling compounds may be linear or branched aliphatic or aromatic in structure comprising up to 18, preferably up to 12 carbon atoms.

It is evident that in cases in which said co-coupling agent is used it has to be used in an approximately equimolar amount relative to the coupling agent.

According to the invention one or more coupling agent(s) can be used. Preferably the amount of the coupling agent(s) is from about 0.05 to about 5 parts by weight, most preferably from about 0.1 to about 4 parts by weight based on 100 parts by weight of (a) chemically modified polyolefin and (b) thermoplastic polyurethane, copolyester or copolyamide.

3.4 Preparation of the Modifying Block-Copolymer

The modifying block-copolymer is obtainable by reactive processing of a mixture comprising (a) the chemically modified polyolefin, (b) the thermoplastic polyurethane, the copolyester or copolyamide and (c) the coupling agent(s) in the amounts indicated above.

In detail the block-copolymers according to the present invention are prepared by melt-mixing, i.e., reactive processing the polymers together in the presence of the coupling agent(s) in an internal mixer, a single screw extruder, a co- or counter rotating twin-screw extruder, an open mill or any other type of equipment suitable and known in the art.

The coupling agent(s) can also be added after the polymers have been molten and blended. The reaction temperature depends on the melting-point of the polar polymer and is between 150° C. to 250° C., preferably between 180° C. and 230° C.

I an in-situ process the modifying block-copolymer can also be prepared in the presence of the thermoplastic elastomer under the conditions mentioned above.

4. Additives

Additives known in the art, such as reinforcing and non-reinforcing fillers, oil, antioxidants, plasticizers, stabilizers, lubricants, antistatic agents, pigments, flame retardants, UV-stabilizers, waxes, process aids, such as lubricants can be added while making the modifying block-copolymers and/or the blends. The amount of said additives, if present, is between about 0.05 and about 50% by weight, based on the total amount of the blends, depending on the nature of the additives themselves.

The invention is further explained by the following examples.

EXAMPLES

Materials

Cellulose propionate

Tenite® 371-12, cellulose acet ate propionate available from Eastman, U.S.

Thermoplastic polyurethane TPU

Texin® DP7-1089 Mobay-Bayer

Block-copolymer

DM 7015 is the pure modifying block copolymer. It is a blend of a hydroxyl containing polypropylene (Exxon) and the TPU (Texin®) in a 20/80 weight ratio. The coupling agent is Grilbond® IL-6, a blocked diisocyanate (EMS-Chemie) at a level of 0.38wt.-%.

The following modified thermoplastic elastomers were used:

DM 7018 is a blend of Santoprene® 8211-35 with DM 7015 at a weight ratio 80/20.

DM 7019 is a blend of Santoprene® 8211-35, DM 7015 and Texin®1089 at a weight ratio 70/20110.

DM 7020 is a blend of Santoprene® 8211-35, DM 7015 and Texin® 1089 at a weigh ratio 60/20/20.

Santoprene® 8211-35 blend of polypropylene with crosslinked EPDM with a Shore A hardness of 35 (ASTM D 2240), available from AES, Advanced Elastomer Systems, Akron, U.S.

Example 1

An 80 ton Engel injection molding machine was used to two shot mold development materials DM7019 and DM7020 onto Tenite® Propionate in the form of a T-bar. Processing conditions for the development materials were as follows:

Machine heat settings were approximately 204° C. in the rear of the barrel increasing to about 232° C. at the nozzle. An average melt temperature was 229° C. Tooling temperatures of the stationary and moveable halves ranged from 38–66° C. Initial injection pressure ranged from 2.40–3.10 MPa. Holding pressure was about 0.52 MPa.

Processing conditions for the Tenite® Propionate were as follows: Machine heat settings of approximately 204° C. in the rear of the barrel and increasing to about 232° C. in the nozzle. An average melt-temperature was 238° C. Tooling temperatures of the stationary and moveable halves ranged from 38–66° C. Initial injection pressure ranged from 3.804.48 MPa. Holding pressure was about 0.69 MPa.

The T-bars specimens measure 13.33 cm long by 2.54 cm wide having approximately 2.54 cm long tabs. A Tensometer T-10 was used to test the peel strength of the T-bars according to ASTM D 429-81. The rate of pull on the T-10 was 5.08 cm/min. Peel strength adhesion properties are found in the Table 1 below:

TABLE 1

| Substrate 1 | Substrate 2 | Peel Strength in N/m |
|---|---|---|
| Tenite ® Propionate | DM7018 | 1226.3 |
| Tenite ® Propionate | DM7019 | 1401.5 |
| Tenite ® Propionate | DM7020 | 1751.9 |

Example 2

An 80 ton Engel injection molding machine was used to two shot mold a blend of 60% Santoprene® 8211-35 and 40% DM7015 (Blend A) onto Tenite® Propionate and a blend of 50% Santoprene® 8211-35 and 50% DM7015 (Blend B) onto Tenite® Propionate. Processing conditions for Blend A, Blend B, and Tenite Propionate were similar to Example 1. Peel strength adhesion properties are found in the Table 2 below.

TABLE 2

| Substrate 1 | Substrate 2 | Peel Strength in N/m |
|---|---|---|
| Tenite ® Propionate | Blend A | 1927.1 |
| Tenite ® Propionate | Blend B | 1927.1 |

The type of failure using Blend A and Blend B onto Tenite® Propionate varied between cohesive and non-cohesive. Cohesive means that tear occurs in the TPE component, non-cohesive means that tear occurs at the interface between the two components. If the modifying block-copolymer is absent from either component in the above examples no adhesion was observed at all.

We claim:

1. A method to adhere a cellulose ester component to a surface of a thermoplastic elastomer component in the absence of any additional adhesive wherein at least one of said components is a blended component comprising a block-copolymer obtained from
   (a) about 5 to about 95% by weight, based on the amount of (a)+(b), of a chemically modified polyolefin,
   (b) about 95 to about 5% by weight, based on the amount of (a)+(b), of a thermoplastic polyurethane (TPU), copolyester or copolyamide, and
   (c) about 0.05 to about 5.0 parts by weight, based on 100 parts by weight of (a)+(b), of one or more coupling agent(s) to couple (a) and (b).

2. The method of claim 1, wherein the amount of the block-copolymer in the blended component is about 5 and about 70% by weight, based on the total amount of the blended component comprising the block-copolymer.

3. The method of claims 1 to 2, wherein the cellulose ester is fully or partially acylated and contains acyl-groups of up to 8 carbon atoms.

4. The method of claim 3, wherein the cellulose ester is selected from the group consisting of cellulose acetate, cellulose propionate, cellulose acetate propionate, cellulose acetate phthalate, cellulose acetate butyrate and blends thereof.

5. The method of claim 1, wherein the thermoplastic elastomer is selected from the group consisting of blends of polyolefins and curable rubbers in which blends the rubber-phase is not cured, partially cured or fully cured; styrene/conjugated diene/styrene block-copolymers; and blends thereof.

6. The method of claim 1, wherein the chemically modified polyolefin of the block-copolymer is selected from grafted polyolefins.

7. The method of claim 1, wherein the thermoplastic polyurethane of the block-copolymer is obtained from the reaction of at least one organic diisocyanate, at least one polymeric diol and at least one difunctional chain extender.

8. The method of claim 1, wherein the thermoplastic copolyamide of the block-copolymer is selected from polyether block amides.

9. The method of claim 1, wherein the coupling agent of the modifying block-copolymer is selected from aromatic, aliphatic and cycloaliphatic diisocyanates or mixtures thereof alone or optionally in combination with a co-coupling agent selected from linear or branched aliphatic or aromatic diamines, diols, diepoxides, amino/hydroxy or amino/epoxy compounds containing up to 18 carbon atoms.

10. A shaped composite article comprising, in adhesion to each other,
   a cellulose ester component, and
   a thermoplastic elastomer component,
   under the proviso that no adhesive is used at the surface between said components,
   wherein at least one of said components is a blended component comprising a block-copolymer comprising a reaction product of
   (a) about 5 to about 95% by weight, based on the amount of (a)+(b), of a chemically modified polyolefin,
   (b) about 95 to about 5% by weight, based on the amount of (a)+(b), of a thermoplastic polyurethane (TPU), copolyester or copolyamide, and
   (c) about 0.05 to about 5.0 parts by weight, based on 100 parts by weight of (a)+(b), of one or more coupling agent(s) to couple (a) and (b).

11. The shaped article of claim 10, wherein the amount of the block-copolymer in the blended component is about 5 and about 70% by weight, based on the total amount of the blended component comprising the block-copolymer.

12. The shaped article of claim 10, wherein the cellulose ester is selected from the group consisting of cellulose acetate, cellulose propionate, cellulose acetate propionate, cellulose acetate phthalate, cellulose acetate butyrate and blends thereof.

13. The shaped article of claim 10, wherein the thermoplastic elastomer is selected from the group consisting of blends of polyolefins and curable rubbers in which blends the rubber-phase is not cured, partially cured or fully cured; styrene/conjugated diene/styrene block-copolymers; and blends thereof.

* * * * *